(12) United States Patent
Tsuji et al.

(10) Patent No.: US 6,569,536 B2
(45) Date of Patent: May 27, 2003

(54) THERMOCONDUCTIVE LIQUID SILICONE RUBBER COMPOSITION FOR FIXING ROLLS AND A FLUORORESIN COATED FIXING ROLL

(75) Inventors: Yuichi Tsuji, Chiba Prefecture (JP); Hiroaki Yoshida, Ichihara (JP); Yutaka Oka, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 149 days.

(21) Appl. No.: 09/911,769

(22) Filed: Jul. 24, 2001

(65) Prior Publication Data

US 2002/0035190 A1 Mar. 21, 2002

(30) Foreign Application Priority Data

Aug. 30, 2000 (JP) .......................................... 2000-261431

(51) Int. Cl.$^7$ .......................... B32B 09/04; C08L 83/05; C08L 83/07; C08G 77/20; C08G 77/12
(52) U.S. Cl. ........................ 428/447; 428/448; 428/450; 524/858; 524/860; 524/861; 524/862; 524/863; 528/15; 528/16; 528/31; 528/32; 528/33
(58) Field of Search ................................ 528/10, 11, 12, 528/13, 14, 15, 16, 31, 32, 33, 35; 524/858, 860, 861, 862, 863, 866; 428/446, 447, 448, 450, 451; 399/122

(56) References Cited

U.S. PATENT DOCUMENTS

| | | | | |
|---|---|---|---|---|
| 5,008,307 A | * | 4/1991 | Inomata | 523/220 |
| 5,223,564 A | | 6/1993 | Nako et al. | 524/430 |
| 6,025,435 A | * | 2/2000 | Yamakawa et al. | 524/862 |

FOREIGN PATENT DOCUMENTS

| | | |
|---|---|---|
| JP | 09-012893 | 1/1997 |
| JP | 10-039666 | 2/1998 |

* cited by examiner

*Primary Examiner*—Robert Dawson
*Assistant Examiner*—Michael J Feely
(74) *Attorney, Agent, or Firm*—Jim L. De Cesare

(57) ABSTRACT

A thermoconductive liquid silicone rubber composition is provided for fixing rolls. The composition is capable of producing silicone rubber of superior thermal conductivity and small compression set after curing. The thermoconductive liquid silicone rubber composition contains (A) a diorganopolysiloxane with at least two silicon bonded alkenyl groups per molecule, (B) an alumina powder with an average particle size not more than 10 $\mu$m and an ignition loss of not more than 0.15 weight percent, (C) an organohydrogenpolysiloxane having at least two silicon bonded hydrogen atoms per molecule, and (D) a platinum catalyst. Fluororesin coated fixing rolls can be fabricated by providing a fluororesin layer on the peripheral surface of a roll shaft, with the silicone rubber layer interposed between it and the surface.

2 Claims, No Drawings ent composition for fixing rolls, and to a fluororesin coated fixing roll. In particular, the fluororesin coated fixing roll and the thermoconductive liquid silicone rubber composition for fixing rolls, have small compression set and are suitable for fixing rolls used in copiers, printers, and fax machines.

THERMOCONDUCTIVE LIQUID SILICONE RUBBER COMPOSITION FOR FIXING ROLLS AND A FLUORORESIN COATED FIXING ROLL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a thermoconductive liquid silicone rubber composition for fixing rolls, and to a fluororesin coated fixing roll. In particular, the fluororesin coated fixing roll and the thermoconductive liquid silicone rubber composition for fixing rolls, have small compression set and are suitable for fixing rolls used in copiers, printers, and fax machines.

BACKGROUND OF THE INVENTION

Thermoconductive silicone rubber compositions mixed with an alumina powder have been described in Japanese Patent Application Publication (Kokai) No. Hei 09-012893, Japanese Patent Application Publication (Kokai) No. Hei 10-039666, and in U.S. Pat. No. 5,223,564. However, the silicone rubber obtained by curing such thermoconductive silicone rubber compositions has large compression set, and when it is used for the fluororesin coated fixing rolls of an electrophotographic copier, printer, or facsimile machine, it exhibits inferior durability.

BRIEF SUMMARY OF THE INVENTION

Thus, it is an object of the invention to provide thermoconductive silicone rubber compositions for fixing rolls capable of producing silicone rubbers of superior heat conductivity and small compression set after curing. It is also an object to provide fluororesin coated fixing rolls prepared with such silicone rubbers.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The thermoconductive liquid silicone rubber composition for fixing rolls according to this invention comprises:

(A) 100 parts by weight of a diorganopolysiloxane having at least two silicon bonded alkenyl groups per molecule and which is a liquid at room temperature;
(B) 10–500 parts by weight of alumina powder with an average particle size of not more than 10 μm, and an ignition loss of not more than 0.15 weight percent measured according to Ignition Loss Test Method described in Japanese Industrial Standard (JIS) H 1901 at a temperature of 1100° C. and a heating time of one hour;
(C) an organohydrogenpolysiloxane having at least two silicon bonded hydrogen atoms per molecule in an amount such that the molar number ratio between silicon bonded hydrogen atoms of component (C) and silicon bonded alkenyl groups of component (A) is 0.3:1 to 5:1; and
(D) a platinum catalyst in an amount such that there is 0.1–500 parts by weight of platinum metal atoms per 1,000,000 parts by weight of component (A); the thermoconductive liquid silicone rubber composition having a coefficient of thermal conductivity of not less than 0.3 W/(m·K) after curing.

A fluororesin coated fixing roll can be made by providing a fluororesin layer on the peripheral surface of a roll shaft using the cured product of the above thermoconductive liquid silicone rubber composition, such that a silicone rubber layer is interposed between it and the surface.

Diorganopolysiloxane (A) has at least two silicon bonded alkenyl groups per molecule, and it is the primary ingredient used for crosslinking the composition of the invention to convert it to rubber. Such diorganopolysiloxanes are substantially linear organopolysiloxanes represented by the average unit formula $R_nSiO_{(4-n)/2}$ wherein R is a monovalent hydrocarbon group, among which are alkyl groups such as methyl, ethyl, propyl, butyl, pentyl, and hexyl; alkenyl groups such as vinyl, allyl, propenyl, and hexenyl; and aryl groups such as phenyl and tolyl. R can also represent halogen substituted monovalent hydrocarbon groups such as 3,3,3-trifluoropropyl and chloropropyl. The n in the formula can be 1.9–2.1.

The content of alkenyl groups in R in such diorganopolysiloxanes is generally 0.01–5 mole percent, and the diorganopolysiloxanes should have a viscosity at 25° C. of 100–1,000,000 mPa·s. These diorganopolysiloxanes are exemplified by dimethylpolysiloxanes end blocked with dimethylvinylsiloxy groups, copolymers of methylvinylsiloxane and dimethylsiloxane end blocked with dimethylvinylsiloxy groups, copolymers of methylphenylsiloxane and dimethylsiloxane end blocked with dimethylvinylsiloxy groups, copolymers of methylphenylsiloxane-methylvinylsiloxane-dimethylsiloxane end blocked with dimethylvinylsiloxy groups, copolymers of diphenylsiloxane and dimethylsiloxane end blocked with dimethylvinylsiloxy groups, copolymers of diphenylsiloxane-methylvinylsiloxane-dimethylsiloxane end blocked with dimethylvinylsiloxy groups, copolymers of methyl(3,3,3-rifluoropropyl)siloxane and dimethylsiloxane end blocked with dimethylvinylsiloxy groups, and copolymers of methyl (3,3,3-trifluoropropyl)siloxane-methylvinylsiloxane-dimethylsiloxane end blocked with dimethylvinylsiloxy groups.

Alumina powder (B) is used to improve the coefficient of thermal conductivity of the silicone rubber obtained by curing the composition. To improve the mechanical strength of the silicone rubber obtained by curing the composition, and to prevent the separation and precipitation of the alumina powder during long-term storage of the composition, the alumina powder should have an average particle size of not more than 10 μm. In addition, its ignition loss measured by the Ignition Loss Test Method described in Japanese Industrial Standard (JIS) H 1901 should be not more than 0.15 weight percent. If the ignition loss exceeds 0.15 weight percent, the compression set of the silicone rubber increases. There are no limitations on the shape of component (B), and spherical and irregular shapes can be used. To increase the dispersibility of component (B) in component (A), the surface of component (B) can be surface treated with an organosilicon compound.

The amount of component (B) is 10–500 parts by weight, preferably 50–300 parts by weight, per 100 parts by weight of component (A). When the amount is less than 10 parts by weight, sufficient thermal conductivity cannot be imparted to the silicone rubber, and when it exceeds 500 parts by weight, the viscosity of the composition increases, the operating properties deteriorate, and the mechanical strength of the silicone rubber decreases.

Organohydrogenpolysiloxane (C) should have at least two silicon bonded hydrogen atoms per molecule. It functions as the crosslinking agent in the composition. These organohydrogenpolysiloxanes can be exemplified by methylhydrogenpolysiloxanes having both terminal ends blocked with trimethylsiloxy groups, copolymers of methylhydrogensiloxane and dimethylsiloxane having both terminals end blocked with trimethylsiloxy groups, copolymers of methylhydrogensiloxane and dimethylsiloxane having both terminals end blocked with dimethylhydrogensiloxy groups, and tetramethyltetrahydrogen cyclotetrasiloxane. The amount of component (C) should be such that the mole ratio of silicon bonded hydrogen atoms in component (C) relative to alkenyl groups in component (A) is 0.3–5.0, preferably 0.4–3.0. If the mole ratio is less than 0.3, the crosslinking density becomes too low, and the cured product does not become elastic. If the mole ratio exceeds 5.0, foam is generated as a result of a dehydrogenation reaction, or can decrease the heat resistance of the material.

Platinum catalyst (D) promotes the addition reaction of component (A) and component (C). Such platinum catalysts can be exemplified by platinum micropowder, platinum black, chloroplatinic acid, alcohol modified chloroplatinic acid, olefin complexes of chloroplatinic acid, and complexes of chloroplatinic acid and alkenylsiloxanes. The amount of component (D) used should be 0.1–500 parts by weight per 1,000,000 parts by weight of component (A).

In addition to components (A)–(D), other additives for silicone rubber can be included in compositions of the invention. For example, the composition can contain cure inhibitors such as 1-ethynyl-cyclohexanol, 3-methyl-1-pentene-3-ol, and benzotriazole; reinforcing fillers such as dry process silica, wet process silica, hydrophobic silicas obtained by treating the surface of such silicas with organochlorosilanes, organoalkoxysilanes, organosiloxane oligomers, and hexaorganodisilazane; semi-reinforcing fillers such as diatomaceous earth, quartz powder, mica, titanium oxide, materials obtained by treatment with organochlorosilanes, organoalkoxysilanes, and fatty acids; and agents for improving heat resistance such as carbon black, red iron oxide, alkali metal oxides, alkaline earth metal oxides, alkali metal hydroxides, alkaline earth metal hydroxides, rare earth oxides, rare earth hydroxides, cerium silanolate, and cerium fatty acid salts. Provided the functioning of the composition is not impaired, there can also be included in the composition flame retardants, inner mold release agents, and pigments.

Equipment used for preparing compositions of the invention includes equipment typically used in production of silicone rubber compositions such as kneader-mixers, pressurizing kneaders, Ross mixers, and continuous kneading extruders.

When heat is used to cure the composition, it is converted to a silicone rubber possessing rubber elasticity. Temperatures which can be used are typically 80–220° C. The coefficient of thermal conductivity of the cured silicone rubber should not be less than 0.3 W/(m·K).

After curing, the silicone rubber composition provides a useful silicone rubber for fabricating fixing rolls because it possesses a high thermal conductivity and a small compression set. In particular, the silicone rubber composition can be used for forming silicone rubber layers of fluororesin coated fixing rolls made by providing a layer of silicone rubber on the peripheral surface of a roll shaft, and then providing a layer of fluororesin over the silicone rubber layer.

When the silicone rubber is used as a coating material for fixing rolls, it is applied to the iron, aluminum, and stainless steel metal roll core of the fixing roll. The fluororesin can be a fluororesin tube or a fluororesin coating agent. Some representative examples of fluororesin coating agents include tubes of polytetrafluoroethylene resin (PTFE), tetrafluoroethylene-perfluoroalkylvinylether copolymer resin (PFA), fluoroethylene-propylene copolymer resin (FEP), ethylene-tetrafluoroethylene copolymer resin (ETFE), polychlorotrifluoroethylene copolymer resin (PCTFE), polyvinylidene fluoride resin (PVDF), polyvinyl fluoride resin (PVF), ethylene-chlorotrifluoroethylene copolymer resin (ECTFE), tetrafluoroethylene-hexafluoropropylene copolymer resin (FEP), polytetrafluoroethylene resin (PTFE) latex, and the DAI-EL fluororesin latex of Daikin Industries, Ltd. The thickness of the fluororesin layer applied over the silicone rubber layer is typically not more than 0.1 mm, preferably 0.1–50 µm; while the thickness of the silicone rubber layer is typically 0.1–50 mm, preferably 0.1–30 mm.

Application & Comparative Examples

The invention is more fully explained by reference to the following application and comparative examples. In the application examples, the term "parts" refers to parts by weight, and the term "viscosity" refers to a the value measured at 25° C. The ignition loss of alumina, and the hardness, compression set, and coefficient of thermal conductivity of the silicone rubber, were measured as explained in detail below.

Ignition Loss of Alumina Powder

This value was measured in accordance with the Ignition Loss Test Method described in Japanese Industrial Standard (JIS) H 1901 at a temperature of 1100° C. and a heating time of one hour. According to this test method, alumina powder was placed in a crucible and weighed. It was placed in a heating furnace at 1100° C. for one hour, after which the crucible was removed from the furnace, and the weight of the alumina after heating was determined. The ignition loss was calculated using the formula:

Ignition Loss (weight %)={(weight after heating−weight prior to heating)/weight prior to heating}×100.

Hardness of Silicone Rubber

After heating and curing the silicone rubber composition at 120° C. for 10 minutes under an elevated pressure, silicone rubber sheets with a thickness of 6 mm were fabricated by heat treating the product for 4 hours at 200° C. The hardness of the silicone rubber sheets was determined using a Japanese Industrial Standard (JIS) Type A durometer in accordance with the procedure described in Japanese Industrial Standard (JIS) K 6249.

Compression Set of Silicone Rubber

After heating and curing the silicone rubber composition at 120° C. for 15 minutes under an elevated pressure, silicone rubber samples with a thickness of 12.7 mm for the compression set determination were fabricated by heat treating the product for 4 hours at 200° C. The compression set of the silicone rubber samples was determined in accordance with the Compression Set Test Method described in Japanese Industrial Standard (JIS) K 6249. The test was carried out at a compression ratio of 25 percent, a heat treatment temperature of 180° C., and heat treatment time of 22 hours.

Thermal Conductivity of Silicone Rubber

After heating and curing the silicone rubber composition at 120° C. for 10 minutes under an elevated pressure, silicone rubber sheets with a thickness of 12 mm were fabricated by heat treating the product for 4 hours at 200° C. The thermal conductivity of the silicone rubber sheets was measured using a thermal conductivity meter using hot wire methodology.

Application Example 1

Three parts of dry process silica with a BET specific surface area of 110 $m^2/g$ and a surface treated with dimethyldichlorosilane, and 120 parts of alumina powder with an average particle size of 3.0 $\mu$m and ignition loss of 0.14 weight percent, were added to 100 parts of a copolymer of methylvinylsiloxane and dimethylsiloxane. The copolymer had a viscosity of 40,000 mPa·s, both terminals of its molecular chain were end blocked with dimethylvinylsiloxy groups, and it had a vinyl group content of 0.13 weight percent. These ingredients were mixed to homogeneity. After mixing the ingredients for one hour at 180° C., a silicone rubber base compound was obtained by cooling the mixture to room temperature. A liquid silicone rubber composition was prepared by combining the cooled mixture with 1.5 parts of a copolymer of dimethylsiloxane and methylhydrogensiloxane with the average molecular formula $Me_3SiO(MeHSiO)_6(Me_2SiO)_4SiMe_3$ in which Me represents the methyl group; 0.5 parts of a complex of chloroplatinic acid and divinyltetramethyldisiloxane having a platinum content of 0.5 weight percent; and 0.04 parts of 1-ethynyl-1-cyclohexanol as cure retardant. These ingredients were mixed to homogeneity. The hardness of the silicone rubber obtained by curing this composition was 23, and its compression set was 5 percent. It had a coefficient of thermal conductivity of 0.35 W/(m·K).

A cylindrical iron roll core with a diameter of 10 mm and a surface treated with Dow Corning Toray Silicone Co., Ltd.'s commercially available primer DY39-051A/B for silicone rubber; and a fluororesin tube of tetrafluoroethylene-perfluoroalkylvinylether copolymer resin with a thickness of 50 $\mu$m, whose inner surface had been treated with an alkali, and whose outside surface had been treated with Dow Corning Toray Silicone Co., Ltd.'s commercially available DY39-067 Primer for silicone rubber; were placed inside the cavity of a fixing roll mold. The silicone rubber composition prepared above was charged into the cavity and cured by heating it at 100° C. for 30 minutes. The roll was removed from the mold, subjected to a post cure treatment in an oven at 200° C. for 4 hours, and yielded a fixing roll coated with silicone rubber and fluororesin, having a thickness of 3 mm. The fixing roll was installed in an electrophotographic copier and used to make 100,000 continuous copies on A4-size copy paper. The image was clearly copied even after 100,000 copies.

Comparative Example 1

A liquid silicone rubber composition was prepared as in Application Example 1 except that the alumina powder used in this Comparative Example 1 had an average particle size of 3.0 $\mu$m and an ignition loss of 0.20 weight percent. The hardness of the silicone rubber obtained by curing the composition was 22 and its compression set was 11 percent. The coefficient of thermal conductivity was 0.35 W/(m·K).

The liquid silicone rubber composition was used to fabricate a fluororesin-coated fixing roll as in Application Example 1. When the fixing roll was installed in an electrophotographic copier and set to make 100,000 continuous copies on A4-size copy paper, paper creasing and clogging was observed after it had produced about 70,000 copies.

Application Example 2

Three parts of dry process silica with a BET specific surface area of 110 $m^2/g$ and a surface treated with dimethyldichlorosilane, and 240 parts of alumina powder with an average particle size of 2.5 $\mu$m and ignition loss of 0.05 weight percent, were added to 100 parts of a copolymer of methylvinylsiloxane and dimethylsiloxane. The copolymer had a viscosity of 40,000 mPa·s, both terminals of its molecular chain were end blocked with dimethylvinylsiloxy groups, and it had a vinyl group content of 0.13 weight percent. These ingredients were mixed to homogeneity. After mixing the ingredients for one hour at 180° C., a silicone rubber base compound was obtained by cooling the mixture to room temperature. A liquid silicone rubber composition was prepared by combining the cooled mixture with 1.5 parts of a copolymer of dimethylsiloxane and methylhydrogensiloxane with the average molecular formula $Me_3SiO(MeHSiO)_6(Me_2SiO)_4SiMe_3$ in which Me represents the methyl group; 0.5 parts of a complex of chloroplatinic acid and divinyltetramethyldisiloxane having a platinum content of 0.5 weight percent; and 0.04 parts of 1-ethynyl-1-cyclohexanol as cure retardant. These ingredients were mixed to homogeneity. The hardness of the silicone rubber obtained by curing this composition was 42, and its compression set was 9 percent. It had a coefficient of thermal conductivity of 0.63 W/(m·K).

After treating a cylindrical iron roll core having a diameter of 10 mm with Dow Corning Toray Silicone Co., Ltd's commercially available DY39-051 A/B primer for silicone rubber, the cylindrical roll shaft was placed in the cavity of a fixing roll mold. The liquid silicone rubber composition prepared above was charged to the mold and cured at 120° C. for 30 minutes. The result was a cylindrical roll shaft coated with a 3.0 mm layer of silicone rubber. It was subjected to post cure treatment at 200° C. for 4 hours. The surface of the silicone rubber was then treated with Daikin Industries, Ltd.'s GLP-103 SR primer for silicone rubber. The silicone rubber surface was uniformly spray coated with a fluororesin. The fluororesin was a fluororesin paint DAI-EL Latex GLS-213F of Daikin Industries, Ltd. The coating of the fluororesin coated fixing roll was allowed to bake at 350° C. for 30 minutes. When the fixing roll was installed in an electrophotographic copier and used to make 100,000 continuous copies on A4-size copy paper, the image was clearly copied even after 100,000 copies.

Comparative Example 2

A liquid silicone rubber composition was prepared as in Application Example 2 except that the alumina powder used in this Comparative Example 2 had an average particle size of 2.5 $\mu$m and an ignition loss of 0.18 weight percent. The hardness of the silicone rubber obtained by curing the composition was 41, and its compression set was 15 percent. The coefficient of thermal conductivity was 0.63 W/(m·K).

The liquid silicone rubber composition was used to fabricate a fluororesin coated fixing roll as in Application Example 2. When the fixing roll was installed in an electrophotographic copier and used to make continuous copies on A4-size copy paper, irregularities in the copied image were observed after making about 70,000 copies.

Thermoconductive liquid silicone rubber compositions for fixing rolls containing components (A)–(D), particularly alumina powder component (B) having an ignition loss of not more than 0.15 weight percent, produce silicone rubbers of superior thermal conductivity and small compression set after curing. Silicone rubber layer of fluororesin coated fixing rolls formed of cured product of such silicone rubber compositions possesses superior durability in printing.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A thermoconductive liquid silicone rubber composition for fixing rolls comprising:

(A) 100 parts by weight of a diorganopolysiloxane having at least two silicon bonded alkenyl groups per molecule, the diorganopolysiloxane being a liquid at room temperature;

(B) 10–500 parts by weight of an alumina powder having an average particle size of not more than 10 $\mu$m and an ignition loss of not more than 0.15 weight percent, the ignition loss being determined according to the Ignition Loss Test Method of Japanese Industrial Standard (JIS) H 1901 conducted at a temperature of 1100° C. and using a heating time of one hour;

(C) an organohydrogenpolysiloxane having at least two silicon bonded hydrogen atoms per molecule, the organohydrogenpolysiloxane being present in the composition in an amount such that the molar ratio between silicon bonded hydrogen atoms in component (C) and silicon bonded alkenyl groups in component (A) is 0.3:1 to 5:1; and (D) a platinum catalyst, the platinum catalyst being present in the composition in an amount such that there are 0.1–500 parts by weight of platinum metal atoms per 1,000,000 parts by weight of component (A); the thermoconductive liquid silicone rubber composition having a coefficient of thermal conductivity not less than 0.3 W/(m·K) after the composition has been cured.

2. A coated fixing roll comprising a fluororesin layer disposed on the peripheral surface of a roll shaft, and a silicone rubber layer interposed between the fluororesin layer and the inner surface of the roll shaft, the silicone rubber layer being the cured product of the thermoconductive liquid silicone rubber composition defined in claim 1.

* * * * *